(12) United States Patent
Pugh

(10) Patent No.: US 11,226,782 B1
(45) Date of Patent: Jan. 18, 2022

(54) DISAMBIGUATION OF PRINTING DEVICE CHARACTERISTICS

(71) Applicant: KYOCERA Document Solutions Inc., Osaka (JP)

(72) Inventor: Eric Pugh, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/150,787

(22) Filed: Jan. 15, 2021

(51) Int. Cl.
*G06F 15/00* (2006.01)
*G06F 3/12* (2006.01)
*G06K 1/00* (2006.01)

(52) U.S. Cl.
CPC ............ *G06F 3/126* (2013.01); *G06F 3/1205* (2013.01); *G06F 3/1236* (2013.01); *G06F 3/1247* (2013.01); *G06F 3/1292* (2013.01)

(58) Field of Classification Search
CPC ...... G06F 3/126; G06F 3/1205; G06F 3/1236; G06F 3/1247; G06F 3/1292
USPC ............................. 358/1.15, 1.14, 1.13, 1.1
See application file for complete search history.

(56) References Cited

U.S. PATENT DOCUMENTS

| | | | |
|---|---|---|---|
| 6,965,958 B1 | 11/2005 | Sugiyama | |
| 7,036,047 B1 | 4/2006 | Yu | |
| 2004/0179230 A1 | 5/2004 | Kitada et al. | |
| 2004/0252341 A1 | 12/2004 | Adachi et al. | |
| 2005/0243364 A1* | 11/2005 | Sakai | H04L 9/3234 358/1.15 |
| 2008/0049246 A1* | 2/2008 | Kim | H04N 1/00233 358/1.15 |
| 2018/0232186 A1* | 8/2018 | Ozon | G06F 3/1256 |
| 2019/0075220 A1* | 3/2019 | Ferreri | H04N 1/6025 |

* cited by examiner

*Primary Examiner* — Douglas Q Tran
(74) *Attorney, Agent, or Firm* — W. Eric Webostad

(57) ABSTRACT

Systems and methods relate generally to disambiguation of printing device characteristics. In an example method thereof, a printing app has user printing priority settings. A demographics data file is generated for a best fit emulation. A best match behavior is determined for a printing device of a plurality of printing devices. The printing device with the best match behavior is selected from the plurality of printing devices. In another method thereof an emulator is initialized. The initialization includes generating a demographics data file by the emulator. The emulator performs operations including: converting input data to device primitives in a printer language to generate print job data therefor; and providing the print job data as a print job to a job manager.

20 Claims, 7 Drawing Sheets

DISAMBIGUATION OF PRINTING DEVICE CHARACTERISTICS

FIELD

The following description relates to a printing device. More particularly, the following description relates to disambiguation of characteristics of a printing device.

BACKGROUND

Conventionally, a user selects a printing device to send a print request or print job to by providing a selection of a driver on a user's device. A driver may allow selection of one or more print job settings, such as for example paper size, color or monochrome, print media type or weight, finishing options, simplex or duplex, paper orientation (e.g. portrait or landscape), collation, and/or margins, among others.

In some instances, a printing device may support an option for a setting, but such a setting may not be installed. Users may not see such an uninstalled setting option displayed on a settings page, or a setting may be shown but indicated as not installed or not selectable. In some instances, a setting may be shown, but may do nothing when selected.

SUMMARY

In accordance with one or more below described examples, a method relating generally to disambiguation of printing device characteristics is disclosed. In such a method, an emulator is initialized. The initialization includes generating a demographics data file by the emulator. The emulator performs operations including: converting input data to device primitives in a printer language to generate print job data therefor; and providing the print job data as a print job to a job manager.

In accordance with one or more below described examples, a system relating generally to disambiguation of printing device characteristics is disclosed. In such a system, a network is for communication with a user device programmed with a printing app. The network includes: a network manager configured for establishing a network handshake with the user device for the printing app; a job manager configured for communication with the network manager for managing print jobs; an emulator configured for communication with the job manager and for emulating language primitives of the print jobs for association with corresponding demographics data files; a primitives store configured for communication with the emulator and configured for storing emulation primitives therein; an imaging pipeline configured for communication with the emulator and the primitives store for rendering each of the print jobs; and a pipeline synchronizer configured for communication with the job manager and the imaging pipeline for synchronizing processing and managing of the print jobs.

In accordance with one or more below described examples, another method relating generally to disambiguation of printing device characteristics is disclosed. In such a method, provided is a printing app having user printing priority settings. A demographics data file is generated for a best fit emulation. A best match behavior is determined for a printing device of a plurality of printing devices. The printing device with the best match behavior is selected from the plurality of printing devices.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 2-1 is a flow diagram depicting an example of an emulation flow.

FIG. 2-2 is a flow diagram depicting an example of a demographics generation flow.

DETAILED DESCRIPTION

Figure 1:
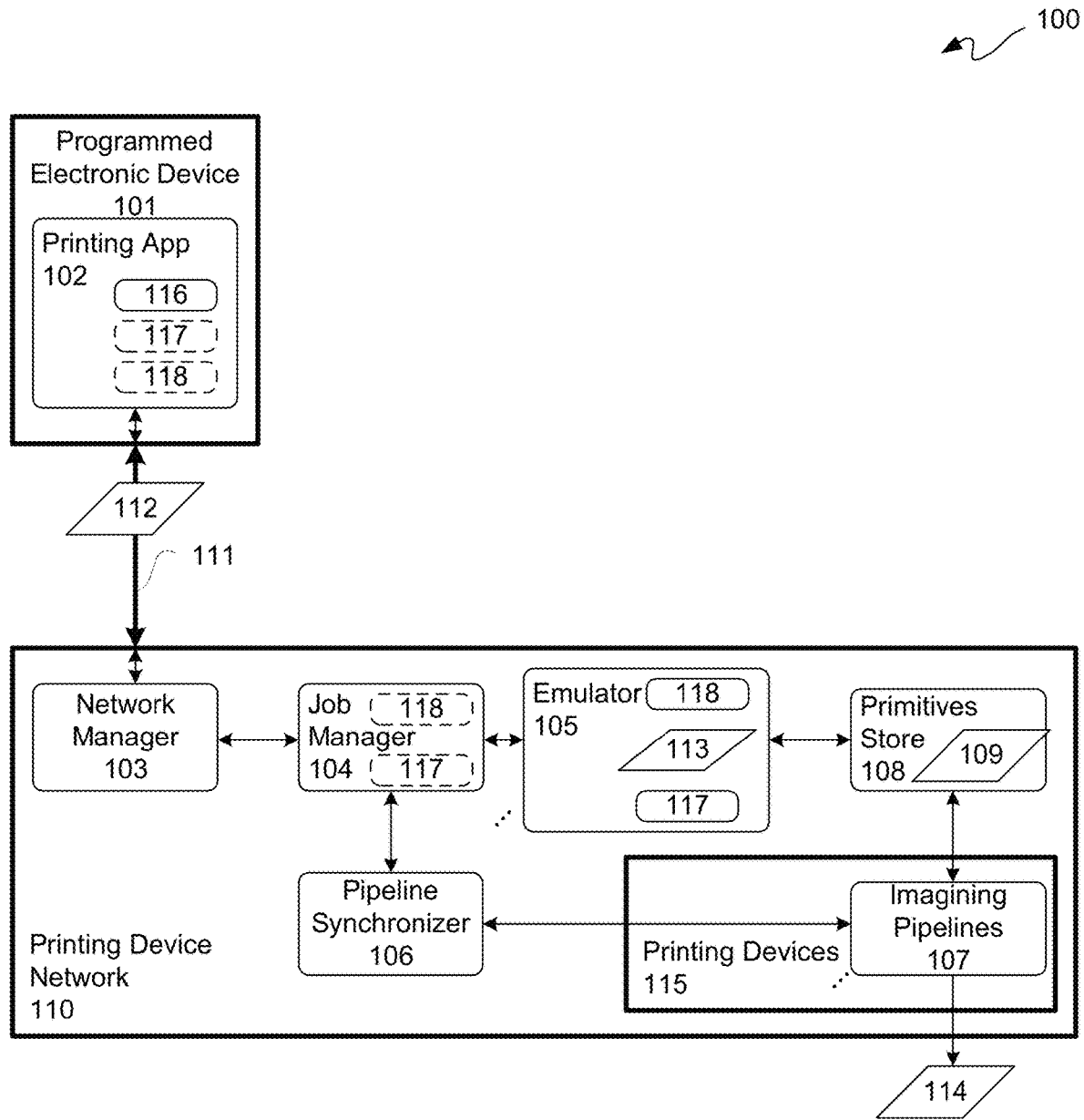
FIG. 1 is a block diagram depicting an example of a printing devices system.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

As previously indicated, in the past a user would make selections from printer driver settings options. However, there are many printer driver settings, and many of which may be unfamiliar to a conventional user. However, as described below in additional detail, a user is allowed to set one or more desired priorities of a printer, such as performance and color, and these priorities may be set using a sliding or other scale so as to indicate relative importance to a user. From there, printing app may communication with a printing network to figure out one or more "best matches" to for emulation, as well as printing device characteristics, to resolve such a request. This allows for a disambiguation of these many printer driver settings.

With the above general understanding borne in mind, various configurations for disambiguation of characteristics of emulations and printing devices, and methods therefor, using demographics capabilities are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1 is a block diagram depicting an example of a printing devices system 100. Printing devices system 100 may include a plurality of user devices, including a programmed electronic device 101, coupled for communication with a printing device network 110. In this example, a communication link 111 for such coupling is a wired link; however, in another example a wireless communication link 111 may be used, or a combination of wired and wireless communication links 111 may be used.

In this example, programmed electronic device 101 is a computer workstation; however, in another example, programmed electronic device 101 may be a smart phone, a tablet, a notebook computer, or other programmable electronic communication device, some of which may be programmed with a printing app 102. In some configurations, printing app 102 may be a print driver. However, in driverless configurations, where pre-generated content may be sent by printing app 102 with an ability to connect to a printing device. Examples of driverless printer apps 102 include AirPrint from Apple, Inc. and Google Cloud Print from Google LLC., among others.

Printing app 102 may be communicate with a network manager 103 of a printing device network 110 to provide thereto print job data 112. Print job data 112 may include user selected printing priorities, as described below in additional detail. Printing app 102 may include a user interface ("UI") 116 for user input of one or more user priorities. Along those lines, sliding scales may be provided for each user priority parameter by UI 116.

Printing device network 110, in addition to network manager 103, may include a job manager 104, an emulator 105, a pipeline synchronizer 106, imaging pipelines 107, and a primitives store or database ("primitives store") 108. Imaging pipelines 107 may be of multiple printing devices of a printing device network 110.

Printing device network 110, for communication with a user device programmed with a printing app 102, may have a network manager 103 configured for establishing a network handshake with such user device for printing app 102. A job manager 104 may be configured for communication with network manager 103 for managing print jobs. Job manager 104 may be in communication with emulator 105.

Emulator 105 may be a smart emulator 105 configured to select a "best match" emulation from a collection of emulations. As is known, printing devices may include multiple emulations, such as for example a PCL emulation, a PostScript emulation, among others. PostScript and PCL (Printer Command Language) are examples of page description languages.

Primitives store 108 may include one or more emulation language primitives accessible by emulator 105 for generation or otherwise obtaining a demographics file or records for execution of a print job. Demographics files or records may include parameters, which may be applied to each print job data 112 set run through emulator 105 to generate a print job 113 therefor. These parameters may include one or more of print performance, color options, print quality, paper size options, media type/weight options, and/or finisher options, among others, and a user may select relative importance of one or more of these parameters, such as with a sliding scale for example for each.

Each parameter listed above may be put in a group by emulator type for selection of a best match emulation. Furthermore, each parameter listed may be put in a group by imaging pipeline type for selection of a best match imaging pipeline.

Primitives store 108 may be in communication with printing devices 115 to obtain therefrom emulations of each of such printing devices and performance parameters of each imaging pipeline of imaging pipelines 107. Available emulations may be categorized according to above-listed parameters, for example, and imaging pipeline parameters may likewise be categorized according to such parameters.

Emulator 105 may have access to different values for each of a plurality of such parameters, such as for example the above-listed parameters. A "best match" determination may be made by matching a best value of each parameter requested by a user. For example, there may be multiple printing devices 115 coupled to a printing device network 110, as generally indicated by multiple imaging pipelines 107. Such printing devices 115 may be directed to different types of performance, such as printing photographs versus high-speed printing. Furthermore, such imaging pipelines 107 may have access to different emulations.

A print job 113 may automatically be generated for a best match printing emulation in association with one or more user selected priorities. Such a print job 113 may then be automatically sent to a selected a best match printing device 115 having such a best match emulation and a best match imaging pipeline 107 in association with one or more user selected priorities.

If a printing device imaging pipeline 107 is a best match for a print job 113, then such a printing device imaging pipeline 107 may be selected and used to generate a print result 114. However, if printing device imaging pipeline 107 is not a best match for a print job 113, then another printing device imaging pipeline 107 in printing device network 110 may be used for such best match. A print job 113 may include an emulation selection for such a best match printing device imaging pipeline 107.

When a user wishes to submit a print request, printing app 102 may communicate over a network with printing device network 110. Printing device network 110 may have access to demographics data via one or more demographics files or records from printing devices 115 to be used in determining a "best match". Along those lines, each imaging pipeline 107, or more generally each printing device 115, may be in communication with a primitives store 108 for providing demographics data thereto. Accordingly, a database of emulation types and performance parameters may be formed in primitives store 108 for generation of a demographics file 109 for each set of print job data 112.

Optionally, a user may provide an indication of one or more preferred printing devices, and a best match emulation may be selected for one of such preferred printing devices. However, for purposes of clarity by way of example and not limitation, printing devices system 100 is assumed to be configured to access printing device network 110 to obtain a "best match" across different printing device imaging pipelines 107 on such a network.

Format of a source file to be printed may be involved in part in a calculation of a "best match". For example, if a printing device platform supports AirPrint, then a print stream may be either URF or PDF. In these instances, a choice of emulator may be pre-determined, where: URF is for AirPrint URF; and PDF is for AirPrint PDF. Additionally, there may be direct-PDF printing. Having a parameter pre-determined may minimize or at least reduce calculation time for a "best match" determination.

With parameters selected by a user, printing app 102 may request a "best match" printing device of printing devices 115. Printing app 102 may then be informed of such a best match printing device in order to direct in response a print stream to such a "best match" derived printing device 115. Optionally, a user may override such an automated selection in favor of a user selected printing device. However, for purposes of clarity and not limitation, it is assumed that an automated best match printing device selection is used.

A print stream may be either an original source file, if a source file format is supported directly by a best match printing device, or an emulator-compatible print stream created by printing app 102 using an outcome of a "best match" determination.

Emulator 105 may be configured to support one or more page description languages ("PDLs"). Emulator 105 for example may control a page layout, may contain text and image information, and may be for ASCII or binary content. Generally, data processed by emulator 105 may be obtained from one or more printing apps 102, whether content thereof is pre-generated or not.

Figures 1, 2:
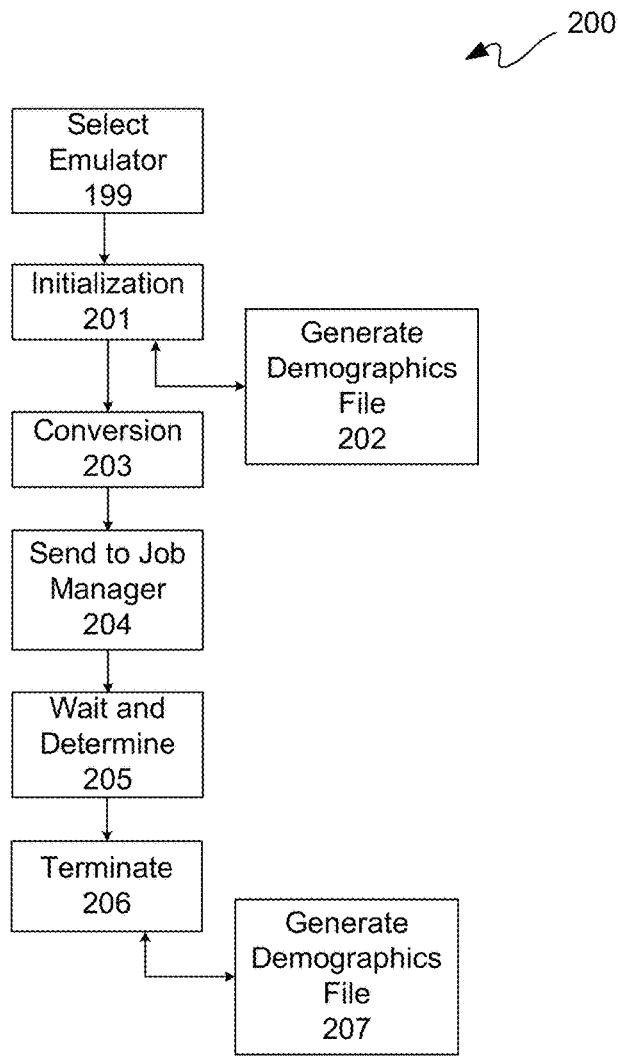
Figure 2:
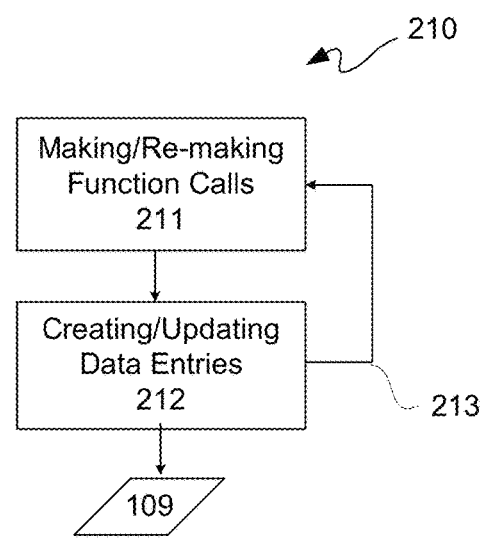

Emulator 105 converts incoming parameter data to a printer internal format, such as bands or other primitives, that may, or may not, be generated to leverage hardware acceleration. FIG. 2-1 is a flow diagram depicting an example of an emulation flow 200. Emulation flow 200 is further described with simultaneous reference to FIGS. 1 and 2-1.

At operation 199, a job manager 104 may select an emulator 105 to initialize. Selection by job manager 104 may be for a best match based on incoming print job parameter data ("print job data") 112. Again, parameters may be grouped by emulator type, and so job manager 104 may be configured to select an emulator 105 of a plurality of emulators responsive to user high priority parameters to select a best match emulator type.

At operation 201, an emulator 105 selected by a smart job manager 104 from a plurality of emulators may be initialized. This initializing may include at operation 202 generating or updating a demographics data file, such as a demographics file 109, by emulator 105, as described below in additional detail, for such a print job 113.

At operation 203, emulator 105 may convert incoming print job data 112 to device primitives, bands, and/or other primitives. For example, input print job data 112 may be converted to device primitives in a printer language to generate a print job 113 for print job source data streamed from printing app 102. For a best match imaging pipeline 107 not capable of directly processing such streamed source data, an emulation for a best match printing device 115 may be performed by converting input print job data 112 into an emulated print job 113 for such a best match imaging pipeline 107.

At operation 204, emulator 105 may pass a newly generated print job 113 to job manager 104 for execution thereof using pipeline synchronizer 106 and imaging pipeline 107, along with any subsequently streamed source data from printing app 102. Each imaging pipeline 107 may be configured for communication with emulator 105 and primitives store 108 for rendering each print job 113 of print jobs 113 processed through printing devices system 100. Job manager 104 may be in communication with pipeline synchronizer 106 for synchronizing operations of each print job 113, including continued receipt of print job data 112 from printing app 102, which additional print job data may be streamed for receipt by a selected best match printing device imaging pipeline 107.

Pipeline synchronizer 106 may be in communication with an imaging pipeline 107 for rendering a print job 113 to provide a printed result 114. Pipeline synchronizer 106 may be configured for communication with job manager 104 and a selected imaging pipeline 107 for synchronizing processing and managing of print jobs 113. Pipeline synchronizer 106 and imaging pipeline 107 may be conventional, and thus are not described in unnecessary detail for purposes of clarity and not limitation.

At operation 205, emulator 105 may wait for completion of execution of a print job 113 by a printing device imaging pipeline 107. However, emulator 105 may continue to operate to provide emulation information for a print job 113 until completed. At operation 205, emulator 105 may determine there is no more incoming print job data 112 to process, and in response to such determination, at operation 206 emulator 105 may terminate a job session associated with print job 113. As part of a termination operation 206, emulator 105 may generate at operation 207 a demographics file or record, which can be concatenated to demographics data file 109. Such demographics file or record may be for performance data.

Along those lines, optionally at initialization operation 202, emulator 105 may register a starting time of a print job 113. Such a registered time may be made with a function call to performance data register, as described below in additional detail. At the conclusion of a print job at termination operation 206, an ending time of such print job may be registered by generating a separate file or concatenable record at operation 207. For example, at operation 207 a function call may be made to register a completion time of a current print job to generate a demographics file 207. With a start time and an end time for a print job 113, a net time may be determined as a performance value associated with a best match imaging pipeline 107 used for execution of such a print job.

FIG. 2-2 is a flow diagram depicting an example of a demographics generation flow 210, such as for use by an emulator 105 of FIG. 1. Emulation flow 200 is further described with simultaneous reference to FIGS. 1 through 2-2.

Demographics generation flow 210 may be used to generate a demographics data record or file 109 at operation 202. Generation of a characteristics data file or record for an imaging pipeline 107 may be performed by a best match emulator 105 selected from a plurality of emulators. This generation of a demographics data record or file ("demographics data file") 109 may be performed by making application programming interface ("API") containing functions calls at operation 211.

These function calls may be used at operation 212 for creating initial or new data entries to generate an initial demographics data file 109 for an imaging pipeline 107. Moreover, such function calls made at operation 211 may be for creating data entries at operation 212 in an existing demographics data file 109, such as for enhancements or added functions. At least one of such function calls made at operation 211 may be remade at operation 211 for updating at least one corresponding existing data entry in an existing demographics data file 109 at operation 212, as generally indicated by feedback path 213.

Primitives store 108 may be a database of registered parameters and values therefor associated with function calls. For a best match emulation, demographics data files 109 may be assembled from such records for a best match printing device 115 for such best match emulation. In another example, primitives store 108 may store multiple demographics data files from multiple print jobs, and optionally with use user provided feedback for generative learning, provide improved demographics data files for subsequent print jobs.

An API 118 may be used to generate a demographics data file 109. Such an API may include multiple register function calls for register data functions, where each such register data function is for storing parametric data. Examples of register data functions may include one or more of:

Register_StartPrintPerformance_Data;
Register_ColorOptions_Data;
Register_PrintQuality_Data;
Register_PaperSizeOptions_Data;
Register_MediaTypeWeightOptions_Data; and/or
Register_FinisherOptions_Data.

In this example, one or more of these or other function calls may be performed at emulator initialization operation 201 by emulator 105. At the end of print job processing, a function/task call may be made to obtain an end time for an emulator terminating a current print job session, such as for example Register_EndPrintPerformance_Data. In another example, job manager 104 may capture an end time at operation 207 to generate a demographics record to update or concatenate to a demographics data file 109 therefor. Furthermore, a combination of end times may be captured to determine different performance metrics, such as to determine total emulator time of operation, pages per minute, and total time to complete a print out of a print result. With respect to pages per minute or other unit of time, a number of pages of a print job value may be associated with a total time to determine pages per minute or other unit of time.

A call to each of such described-above functions creating/updating entries for a characteristics data file may involve adding a call to each of these added functions in or for a function/task emulator initialization operation 201. Such functions may update/create entries in a characteristics data file, such as a demographics data file 109, that describes each parameter, such as color options, print quality, paper size options, media type/weight, and finisher options. Furthermore, entry values may contain data collated from many runs of real-world file examples. These values may describe features each emulator supports. Along those lines, a print job request indicated in print job data 112 may include one or more values for associated functions not supported by an emulator. While one or more other values for associated functions may be supported by an emulator. In contrast, print performance data may be obtained from processing job content, such as the time taken to process print job content.

For emulator 105 to generate a characteristics data file entry API for Register_PrintPerformance_Data, which may be used instead of Register_StartPrintPerformance_Data and Register_EndPrintPerformance_Data, this function may create an entry at the beginning of a print job task, and update such entry at the end of a print job task indicating a net time. This characteristics data file entry may be for print performance. Such update may be called from a function/task of an emulator 105 terminating an associated print job session. An emulator entry may be made in a characteristics data file, such as to update a pages per minute value for print performance. A function/task emulator terminating a print job session may occur responsive to emulator 105 receiving a communication from imaging pipeline synchronizer 106 that a current print job has completed.

For emulator 105 to generate a characteristics data file entry API for Register_ColorOptions_Data, this function may create/update a characteristics data file entry for color options data. Called from function/task emulator initialization operation 201 for emulator 105 entry in a characteristics data file for each color options parameter, and each such color options parameter may be updated.

For emulator 105 to generate a characteristics data file entry API for Register_PrintQuality_Data, this function creates/updates a characteristics data file entry for print quality data. Called from a function/task emulator initialization operation 201, for emulator entry in a characteristics data file, update each print quality parameter.

For emulator 105 to generate a characteristics data file entry API for Register_PaperSizeOptions_Data, this function creates/updates a characteristics data file entry for paper size data. Called from a function/task emulator initialization operation 201, for emulator entry in a characteristics data file, update each paper size parameter.

For emulator 105 to generate a characteristics data file entry API for Register_MediaTypeWeightOptions_Data, this function creates/updates a characteristics data file entry for media data, such as for example paper size data. Called from a function/task emulator initialization operation 201, for emulator entry in a characteristics data file, update each media parameter.

For emulator 105 to generate a characteristics data file entry API for Register_FinisherOptions_Data, this function creates/updates a characteristics data file entry for finisher data, such as for example paper size data. Called from a function/task emulator initialization operation 201, for emulator entry in a characteristics data file, update each finisher parameter.

Even though emulator 105 was described as having an API 118 for making function calls to generate a demographics data file 109, in another example either printing app 102 or job manager 104 may be configured with an API 118 for making function calls to generate a demographics data file 109.

To recapitulate, a best match emulation and imaging pipeline may be found for disambiguation of printing device characteristics, namely to automatically select a best match for a user's designated printing priorities. Along those lines, a user may generally state what priorities they have for a document to be printed without having to have a detailed knowledge of all possible settings available. Optionally, user input may be provided on a sliding scale for each listed priority in a UI of printing app 102.

Printing app 102, job manager 104, or emulator 105 may be configured to find a best match emulation. For a printing app 102, such printing app 102 may be configured to invoke a network services code to perform network handshaking between printing device network 110 and programmed electronic device 101. An API function call SendEmulatorCharacteristicsDataFileToClient may be used in response to such a network services code send a demographics data file 109 to printing app 102. However, this may expose a demographics data file 109 having proprietary information if sent as clear text, accordingly printing app 102 may be configured to communicated with encryption.

However, for additional security, an API function call of SendEmulatorCharacteristicsDataFileToPrinter may be used. In this example, rather than sending a demographics data file 109 to a client printing app 102, such a demographics data file 109 may be sent to a best match printing device 115 directly for setting up such printing device for a print job 113. Along those lines, a demographics data file 109 may be kept within printing device network 110. Such communication within printing device network 110 may be encrypted for purposes of additional security.

In another example, an API function call of SendEmulatorCharacteristicsDataFileToEmulator or An API function call SendEmulatorCharacteristicsDataFileToJobManager may be used. Whether used by printing app 102, job manager 104, or smart emulator 105, a demographics data file 109 may be used to add a best match behavior for printing a print job for selection of a printing device 115.

Printing app 102 may be configured to obtain user requirements or priorities, and a best match between user priority settings of printing app 102 and a printing device 115 may be determined by for example emulator 105 or job manager 104 configured to obtain comparisons for identification of best fits or matches. A best fit emulation may be produced from such comparison. Results of comparisons may be used to automatically select a best match for a printing device 115. Optionally, such a selection may be presented to a user on a display a programmed electronic device 101 for confirmation.

In this example, emulator 105 includes a best match API routine 117 for selection of a best match printing device 115. However, in another example, job manager 104 or printing app 102 may include a best match API routine 117.

Figure 3:
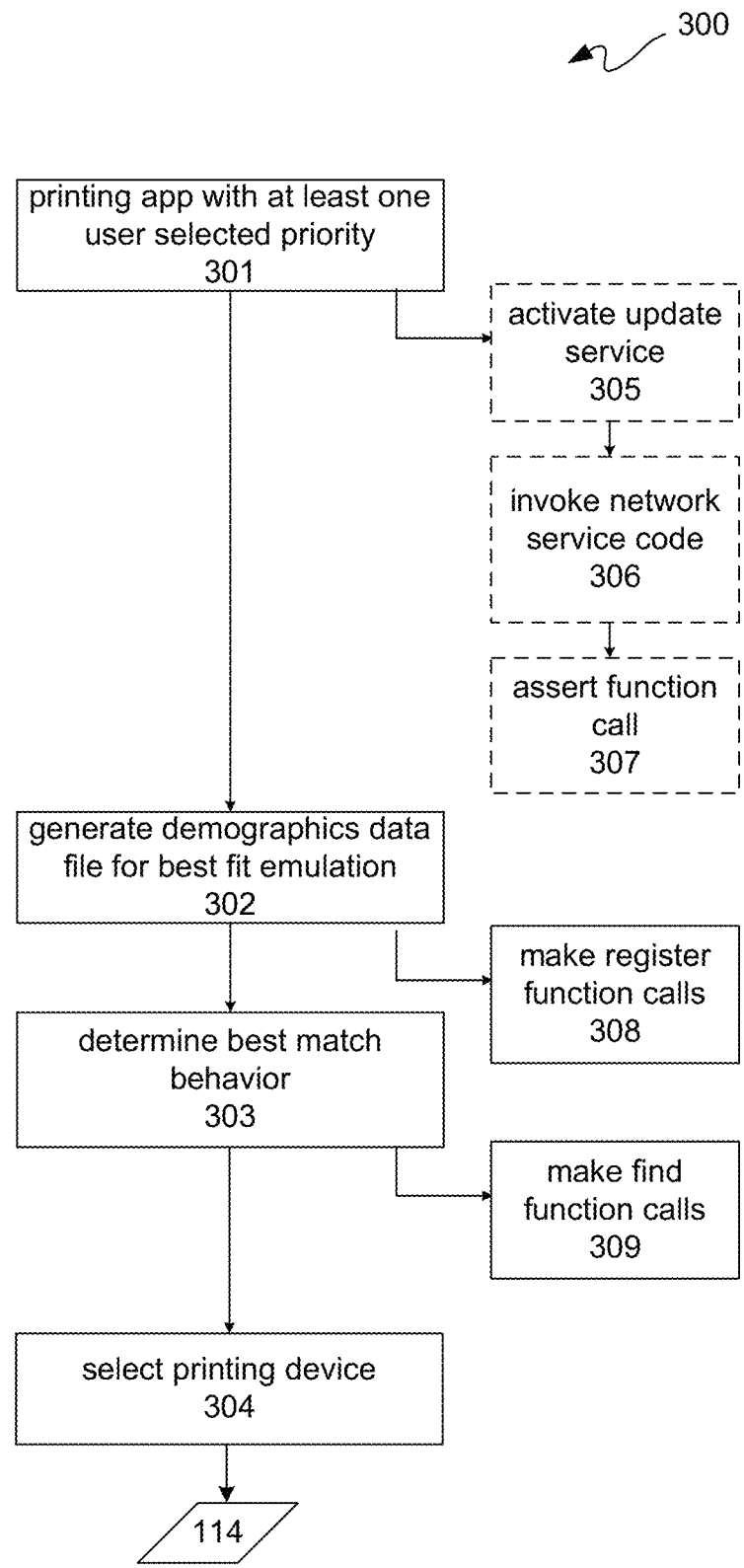
FIG. 3 is a flow diagram depicting an example of a selection flow.

FIG. 3 is a flow diagram depicting an example of a selection flow 300. Selection flow 300 is further described with simultaneous reference to FIGS. 1 through 3-1.

At operation 301, a user may input one or more selected priorities into a printing app 102, or default parameters therefor may have been set. At operation 302, a demographics data file 202 for a best match or fit emulation may be generated. As part of operation 302, register function calls may be made at operation 308. Such register function calls may include one or more of register print performance, register color options, register print quality, register paper size options, register media type weight option, or register finisher options as previously described for generation of a demographics data file 109.

At operation 303, a best match behavior for a printing device 115 may be determined. In an example, an emulator 105 may be configured to provide best match behavior between a printing app 102 set with one or more user selected priorities and a demographics data file 109 with a best emulation fit. In this example, an emulator 105 may obtain a user's intent via print job data 112 sent from printing app 102 to emulator 105. A user's intent may be reflected in one or more user selected priorities.

In another example, a job manager 104 may be configured to provide best match behavior between a printing app 102 set with one or more user selected priorities and a demographics data file 109 with a best emulation fit. In yet another example, a printing app 102 may be configured to provide best match behavior between a printing app 102 set with one or more user selected priorities and a demographics data file 109 with a best emulation fit.

Again, a printing device 115 may support more than one emulation, and so a best emulation may be selected. However, after a best fit emulation is selected as indicated by generation of a demographics data file 109, a best printing device 115 supporting such an emulation may be selected. Furthermore, such a demographics data file 109 may provide information for operation of a printing device in an emulation mode. Even though multiple printing devices 115 may support a best fit emulation, such printing devices 115 may have different operation characteristics, such as with respect to performance, color, print quality, paper size, media, and/or finishing.

In an example where printing app 102 is configured to provide a best match or fit behavior between user selected priorities, including default priorities, set in such printing app and a demographics data file 109 for a best fit emulation, then optional operations 305 through 307 may be performed as part of operation 301.

At operation 305, an update service of printing app 102 may be activated. While executing such an update service on a programmed electronic device 101, such update service may invoke a network service code at operation 306. Such a network service code may be of a printing device 115 or, more generally, of printing device network 110. In response to such network service code, a network handshake between printing device network 110 and programmed electronic device 101 may be established. Such an update service may include a function call, such as for example an API function call SendEmulatorCharacteristicsDataFileToClient. In response to such function call, a demographics data file 109 may be sent to programmed electronic device 101 for printing app 102 at operation 302.

As part of operation 303, a plurality of find function calls may be made at operation 309 to determine a best match or fit behavior for a printing device 115. Such find function calls may be made using a best match of fit API routine 117.

In an example of a best match API routine 117, a FindBestPrintPerformanceEmulator function may be used to access print performance data of a characteristics data file, such as of a demographics data file 109. If performance is not selected by a user for a best match, then an empty emulator set may be returned for this function. If, however, performance is selected by a user for a best match, then for each emulation, a best print performance, such as maximum pages per minute for example, may be found in primitives store 108. Each emulation with best print performance may be returned. If more than one emulation is returned, then a set of emulators with best print performance may be used for finding a best match for this function.

In an example of a best match API routine 117, a FindBestColorOptionsEmulator function may be used to access color options data of a characteristics data file, such as of a demographics data file 109. If color is not selected by a user for a best match, then an empty emulator set may be returned for this function. If, however, color is selected by a user for a best match, then for each emulation, a best color options parameter, such as maximum value for example, may be found in primitives store 108. Each emulation with best print color may be returned. If more than one emulation is returned, then a set of emulators with best print color may be used for finding a best match for this function. Examples of color options parameters that may be searched for best matches may include one or more of: number of planes, RGB support, CMY support, CMYK support, and/or tag plane support.

In an example of a best match API routine 117, a FindBestPrintQualityEmulator function may be used to access print quality data of a characteristics data file, such as of a demographics data file 109. If print quality is not selected by a user for a best match, then an empty emulator set may be returned for this function. If, however, print quality is selected by a user for a best match, then for each emulation, a best print quality value, such as a maximum value, may be found in primitives store 108. Each emulation with best print quality may be returned. If more than one emulation is returned, then a set of emulators with best print quality may be used for finding a best match for this function. Examples of print quality options parameters that may be searched for best matches may include one or more of: resolution, resolution enhancement, trapping support, and/or ISO 12647 compliance.

In an example of a best match API routine 117, a FindBestPaperSizeOptionsEmulator function may be used to access paper size options data of a characteristics data file, such as of a demographics data file 109. If paper size is not selected by a user for a best match, then an empty emulator set may be returned for this function. If, however, paper size is selected by a user for a best match, then for each emulation, a best paper size value, such as a maximum value, may be found in primitives store 108. Each emulation with best paper size option may be returned. If more than one emulation is returned, then a set of emulators with best paper size options may be used for finding a best match for this function. Examples of paper size options parameters that may be searched for best matches may include one or more of: pages sizes supported, and/or orientations supported.

In an example of a best match API routine 117, a FindBestMediaTypeWeightOptionsEmulator function may be used to access media type/weight options data of a characteristics data file, such as of a demographics data file 109. If media type/weight is not selected by a user for a best match, then an empty emulator set may be returned for this function. If, however, media type/weight is selected by a user for a best match, then for each emulation, a best media type/weight value, such as a maximum value, may be found in primitives store 108. Each emulation with best media type/weight option may be returned. If more than one emulation is returned, then a set of emulators with best media type/weight options may be used for finding a best match for this function. Examples of media type/weight options parameters that may be searched for best matches may include one or more of: media type supported and/or media weight supported.

In an example of a best match API routine 117, a FindBestFinisherOptionsEmulator function may be used to access finisher options data of a characteristics data file, such as of a demographics data file 109. If finisher is not selected by a user for a best match, then an empty emulator set may be returned for this function. If, however, finisher is selected by a user for a best match, then for each emulation, a best finisher value, such as a maximum value, may be found in primitives store 108. Each emulation with best finisher option may be returned. If more than one emulation is returned, then a set of emulators with best finisher options may be used for finding a best match for this function. Examples of finisher options parameters that may be searched for best matches may include each of different finisher options supported.

After operation 303, a printing device 115 of a plurality of printing devices 115 of printing device network 110 may be selected at operation 304 in response to a best match or fit behavior determined at operation 303. A print job 113 may be sent to such selected printing device for producing a print result 114.

Because one or more of the examples described herein may be implemented in using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

Figure 4:
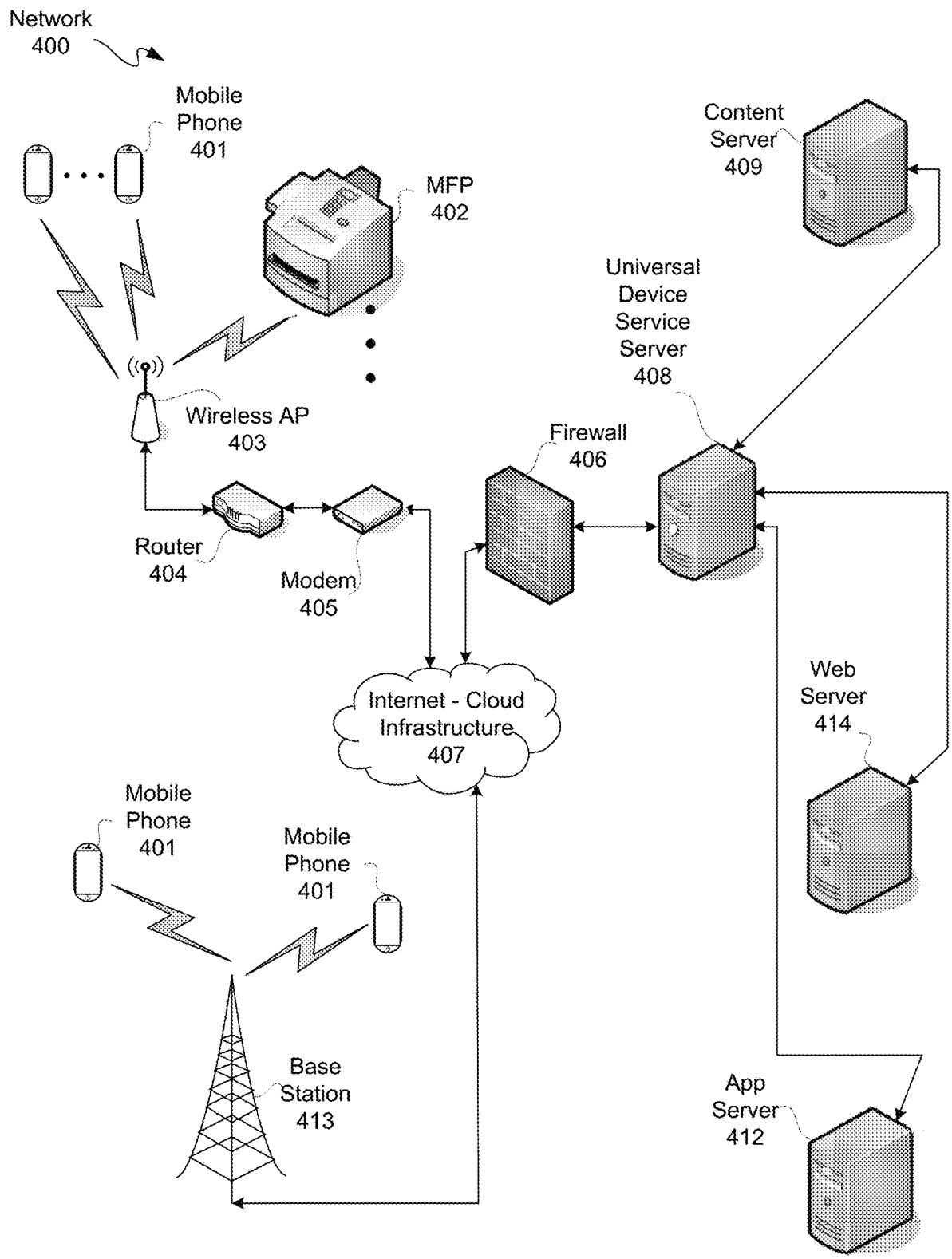
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413. Additionally, a desktop computer and/or a printing device, such as for example multi-function printers ("MFPs") 402, each of which may be a web-usable device, may be in wireless and/or wired communication to and from router 404.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
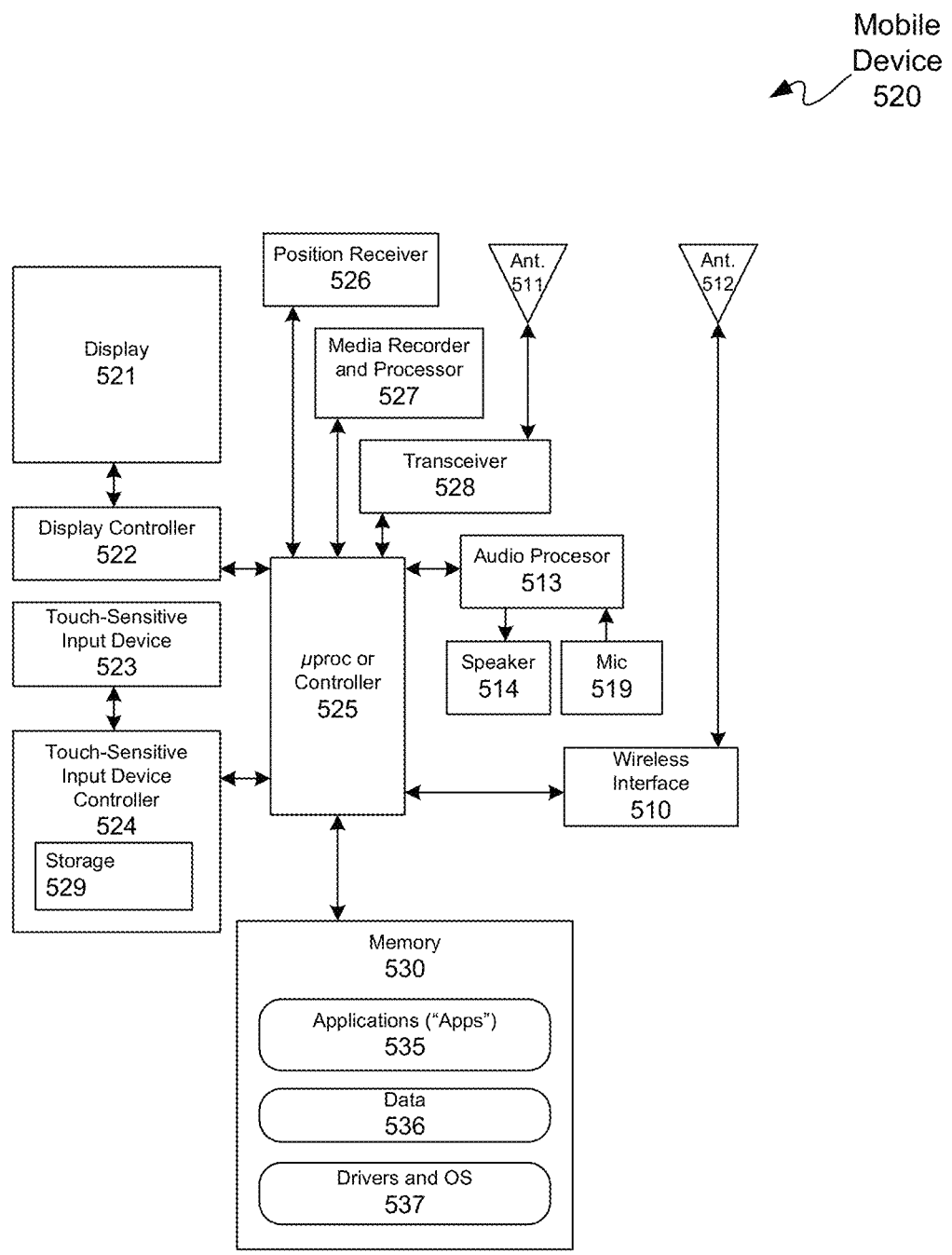
FIG. 5 is block diagram depicting an example of a portable communication device.

FIG. 5 is block diagram depicting an example of a portable communication device ("mobile device") 520. Mobile device 520 may be an example of a mobile device, as previously described.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
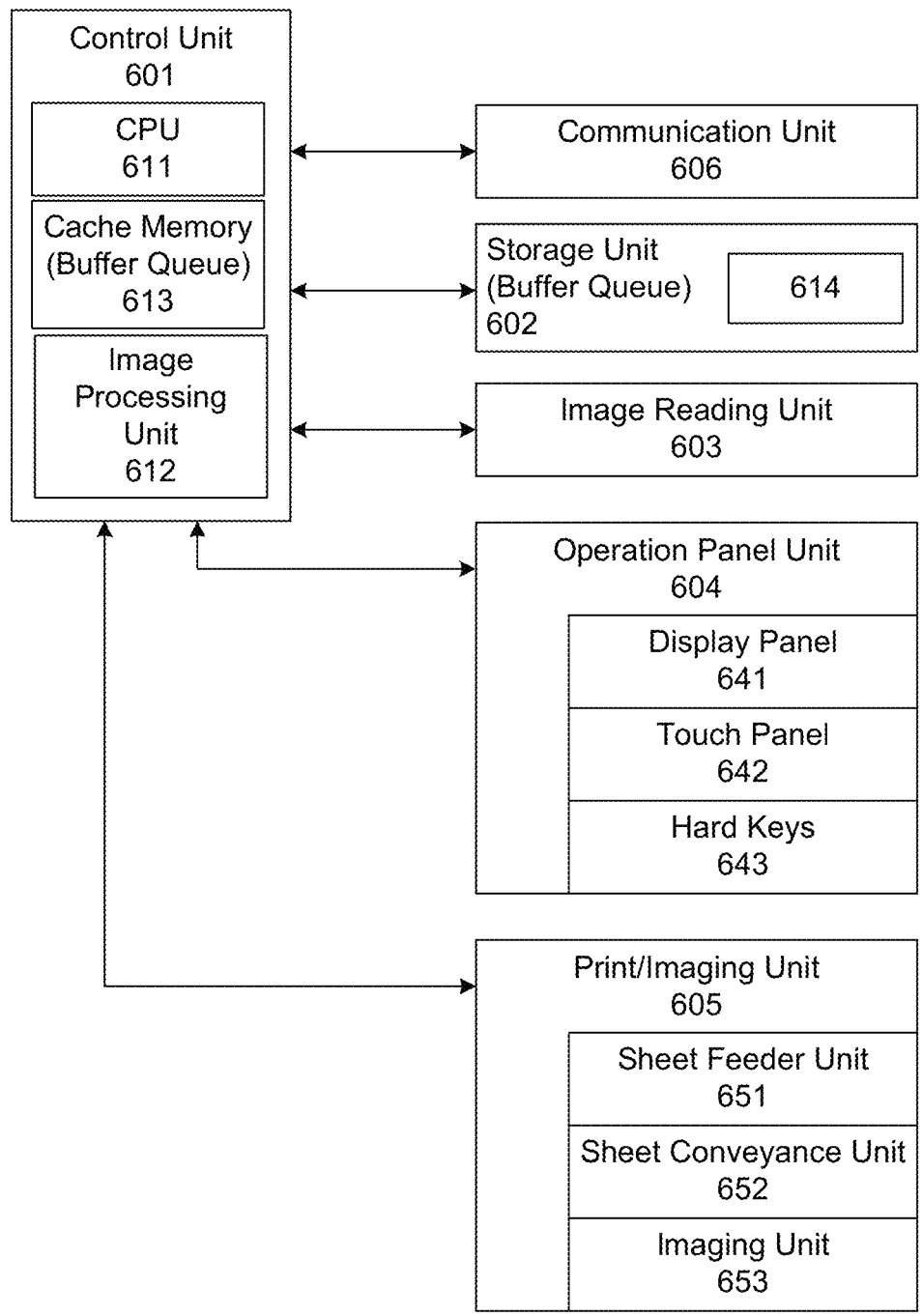
FIG. 6 is a block diagram depicting an example of a multi-function printer (MFP).

FIG. 6 is a block diagram depicting an example of a multi-function printer (MFP) 600. MFP 600 is provided for purposes of clarity by way of non-limiting example. MFP 600 is an example of an information processing system such as for handling a print job as previously described.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer program 614. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
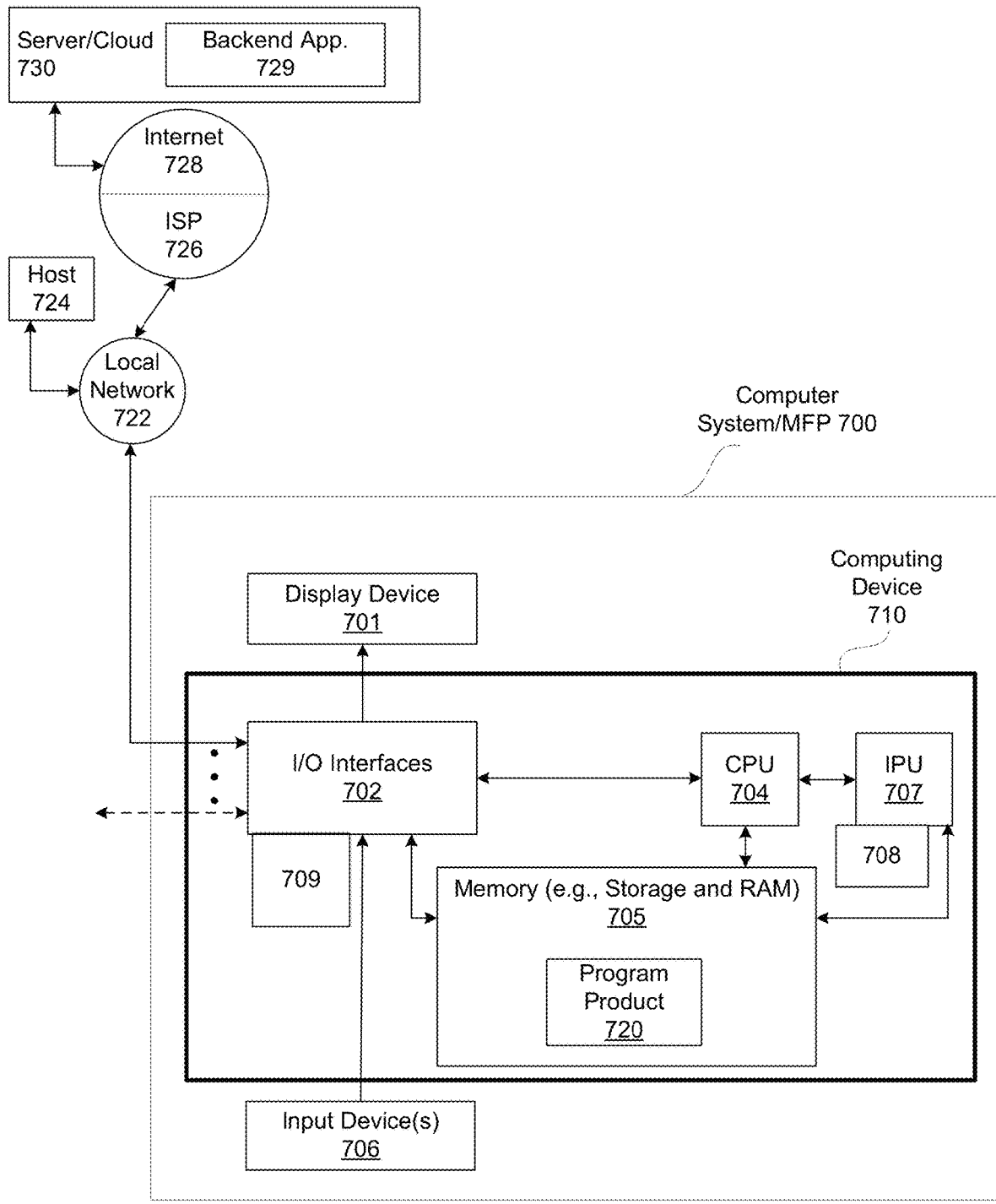
FIG. 7 is a block diagram depicting an example of a computer system.

FIG. 7 is a block diagram depicting an example of a computer system or MFP ("computer system") 700, upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for disambiguation of printing device characteristics, comprising:
   initializing an emulator;
   the initializing including generating a demographics data file by the emulator; and
   wherein the emulator performs operations comprising:
     converting input data to device primitives in a printer language to generate print job data therefor; and
     providing the print job data as a print job to a job manager.

2. The method according to claim 1, wherein the generating of the demographics data file comprises:
   making function calls; and
   creating initial data entries in the demographics data file responsive to the function calls.

3. The method according to claim 2, wherein the making of the function calls is a first making of the function calls, and wherein the generating of the demographics data file comprises:
   second making of at least one of the function calls; and
   updating at least one existing data entry in the demographics data file responsive to the at least one of the function calls.

4. The method according to claim 2, wherein the function calls include register data functions of an application programming interface.

5. The method according to claim 3, wherein the register data functions include one or more of register color options data, register print quality data, register paper size options data, register media type weight options data, or register finisher options data.

6. The method according to claim 4, further comprising:
   waiting for completion of execution of the print job by an imaging pipeline; and
   terminating a job session associated with the print job by the emulator;
   calling a register print performance data function of the application programming interface as part of the terminating of the job session; and
   registering time taken for completion of the print job for a data entry for association with a number of pages of the print job.

7. A system for disambiguation of printing device characteristics, comprising:
   a network for communication with a user device programmed with a printing app, wherein the network comprises:
     a network manager configured for establishing a network handshake with the user device for the printing app;
     a job manager configured for communication with the network manager for managing print jobs;
     an emulator configured for communication with the job manager and for emulating language primitives of the print jobs for association with corresponding demographics data files;
     a primitives store configured for communication with the emulator and configured for storing emulation primitives therein;
     an imaging pipeline configured for communication with the emulator and the primitives store for rendering each of the print jobs; and
     a pipeline synchronizer configured for communication with the job manager and the imaging pipeline for synchronizing processing and managing of the print jobs.

8. The system according to claim 7, wherein the emulator is configured to provide best match behavior between the printing app and the demographics data file.

9. The system according to claim 8, wherein the emulator is configured with an application programming interface having find best match function calls.

10. The method according to claim 9, wherein the find best match function calls include one or more of find best print performance, find best color options, find best print quality, find best paper size options, find best media type weight option, or find best finisher options.

11. The system according to claim 7, wherein the job manager is configured to provide best match behavior between the printing app and the demographics data file.

12. The system according to claim 7, wherein the printing app is configured to provide best match behavior between the printing app and the demographics data file.

13. The system according to claim 12, wherein the printing app is configured to activate an update service.

14. The system according to claim 13, wherein a network service code is invoked through the update service for the printing app to obtain a network handshake between the network manager and the user device.

15. The system according to claim 14, wherein the update service includes a function call to send the demographics data file from the network to the user device for the printing app.

16. The system according to claim 7, wherein the demographics data file includes characteristics of printing devices to find a best match behavior for the printing app.

17. The system according to claim 7, wherein the emulator is configured with an application programming interface to make function calls to generate a demographics data file of the demographics data files for a print job of the print jobs.

18. The system according to claim 17, wherein the function calls include one or more of register print performance, register color options, register print quality, register paper size options, register media type weight option, or register finisher options.

19. A method for disambiguation of printing device characteristics, comprising:
   providing a printing app having user printing priority settings;
   generating a demographics data file for a best fit emulation;
   determining a best match behavior for a printing device of a plurality of printing devices; and
   selecting the printing device with the best match behavior from the plurality of printing devices.

20. The method according to claim 19, wherein:
   the generating of the demographics data file comprises making register function calls; and
   the determining of the best match behavior comprises making find function calls.

* * * * *